Sept. 24, 1957 E. G. ROEHM 2,807,240
AUTOMATIC COMPENSATING MECHANISM FOR MILLING MACHINE
Filed Sept. 28, 1954 2 Sheets-Sheet 1

INVENTOR.
ERWIN G. ROEHM
BY
H. K. Parsons + L. W. Wright.
ATTORNEYS.

Sept. 24, 1957 E. G. ROEHM 2,807,240
AUTOMATIC COMPENSATING MECHANISM FOR MILLING MACHINE
Filed Sept. 28, 1954 2 Sheets-Sheet 2
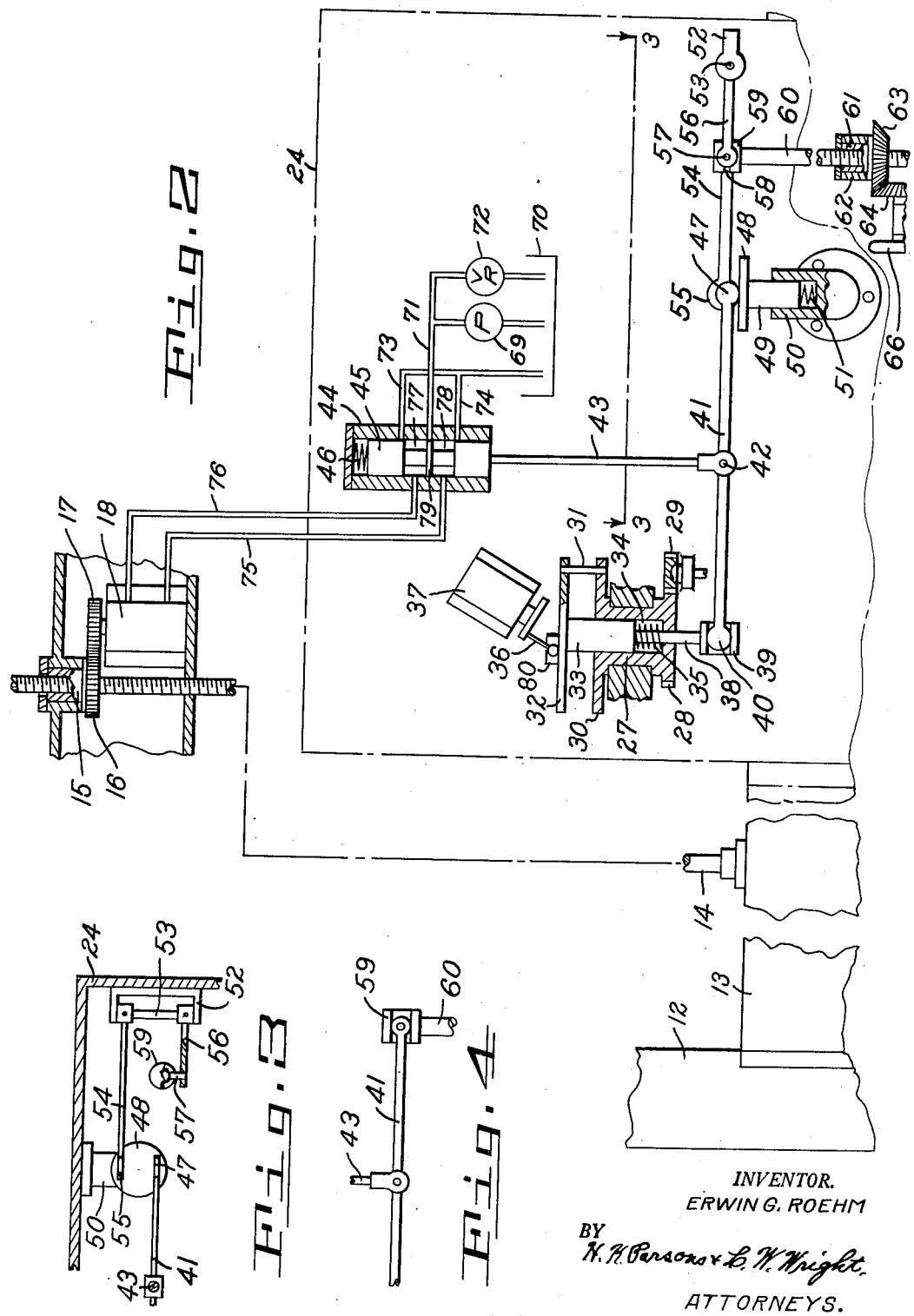
INVENTOR.
ERWIN G. ROEHM
BY
H. H. Parsons & C. W. Wright
ATTORNEYS.

United States Patent Office 2,807,240
Patented Sept. 24, 1957

2,807,240

AUTOMATIC COMPENSATING MECHANISM FOR MILLING MACHINE

Erwin G. Roehm, Norwood, Ohio, assignor to Cincinnati Milling Machine Co., Cincinnati, Ohio, a corporation of Ohio Application September 28, 1954, Serial No. 458,780

7 Claims. (Cl. 121—41)

This invention relates to improvements in milling machines and has particular reference to an improved structure for use in connection with automatic contouring or like operations.

One of the objects of the present invention is the provision of an improved structure particularly adapted for the automatic control of depth positioning of a cutter in a contouring machine in which there is a varying angular relationship between the operative face of the cutter and the work during a machining operation.

A further object of the invention is the provision in a machine of this character of an improved structure for automatically maintaining the cutter at a desired depth or height relationship with respect to the work but in which the actual height relationship or effective zone of automatic positioning of the cutter may be readily controlled.

Another object of the invention is the provision of an improved simplified construction of depth control mechanism for use in contouring machines in which the zone adjusting mechanism will additionally function as a feed back in connection with the automatic control or operation of the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2 is a semi-diagrammatic sectional view illustrating one embodiment of the principles of the invention.

Figure 3 is a fragmentary sectional view on the line 3—3 of Figure 2, and

Figure 4 is a fragmentary view of a modified form of the invention.

Figure 1:
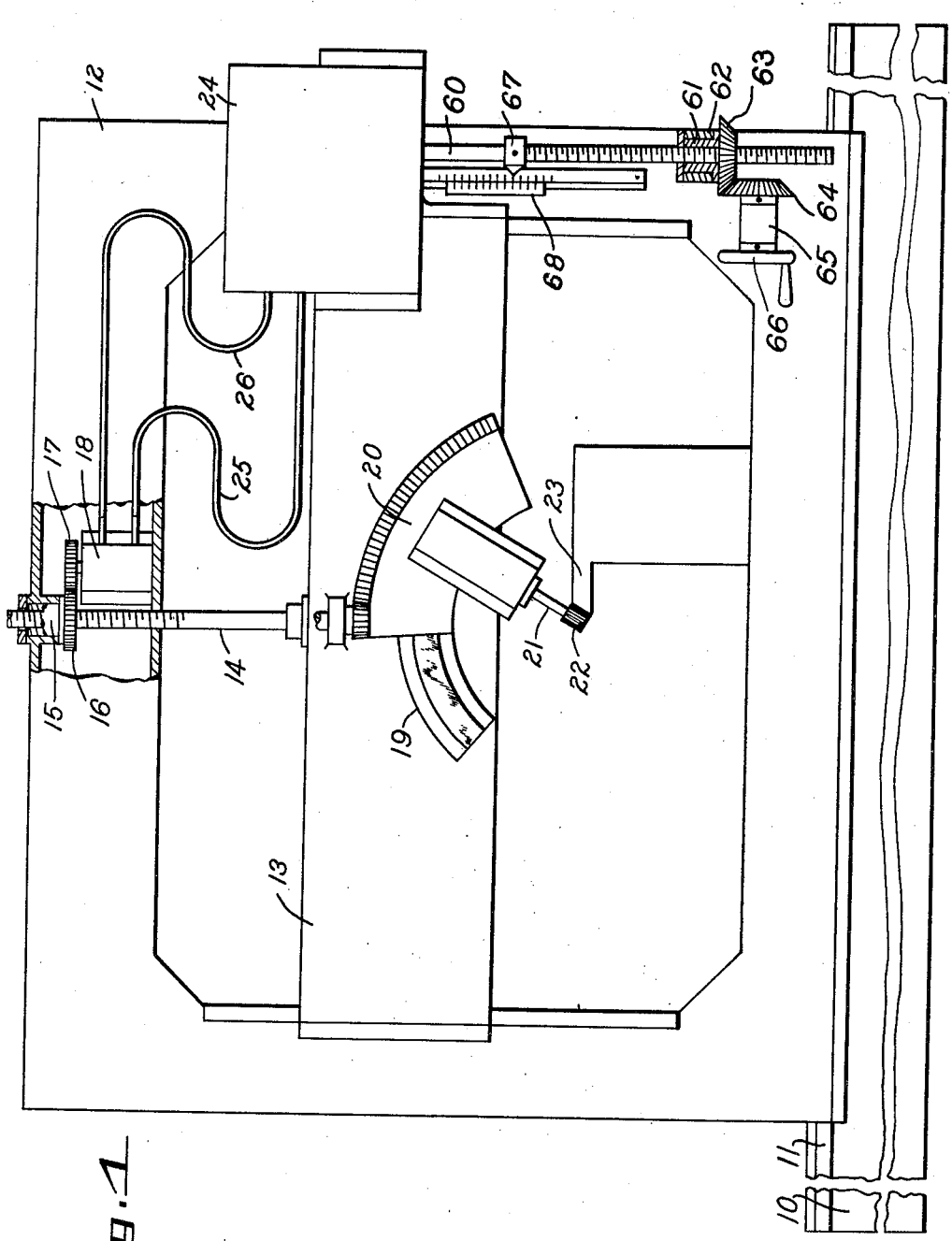
Figure 1 is a front elevation of a milling machine of the contouring type embodying the present invention.

In the drawings the numeral 10 designates the bed of the machine having ways 11 for the translatable frame member 12 which, in turn, supports for vertical movement the cutter slide 13. For effecting vertical adjustment of the slide 13 with respect to the member 12, the slide is provided with the feed screw 14 extending upwardly through nut 15 which is journaled in the frame 12 and provided with gear 16 meshing with gear 17 rotatable by hydraulic motor 18. Carried by the slide are the ways 19 mounting the arcuately adjustable carrier 20 for spindle 21 having cutter 22 for operation on workpiece 23 supported by the bed 10.

Slide 13 additionally supports the control box 24 from which extend the conduits 25 and 26 forming part of the hydraulic control system for the motor 18. Mounted within this control box is a rotatable bushing 27 provided with a gear 28 driven by a pinion 29 from a suitable source of power, not shown, to effect rotation of the bushing. The bushing has a flanged upper portion at 30 carrying a driving pin 31 engaged in the top flange 32 of a plunger 33 vertically slidable in the bore 34 of the bushing 27. Interposed spring 35 serves to urge the plunger 33 upward to move the flange 32 into engagement with the lower end of an eccentric shifter or arm 36 journaled in the bearing 37 mounted in the control box on slide 13. The foregoing elements contained within the control box have been but briefly described as the specific structure of the control arm and drive for the bushing 33 have been disclosed and claimed in detail in co-pending application, Serial No. 454,892 filed September 9, 1954, by Mario Martellotti and Erwin G. Roehm, now U. S. Patent No. 2,793,568.

Depending from the plunger 33 is the rod 38 provided with a yoke 39 receiving ball 40 on one end of the link 41. Intermediately pivoted to the link 41 at 42 is the stem 43 of a reversing valve which controls the vertical adjustment of the slide 13. This valve includes the outer bushing 44 and the movable spool 45 to which the rod 43 is connected. A spring 46 interposed between the end of the valve and the bushing serves to urge the valve and valve stem downward. To resist this downward movement the link 41 is provided at the end opposite the ball 40 with a second ball 47 resting on the fulcrum provided by the flange or mushroom head 48 of a second plunger 49, which is slidable in the bushing 50 secured to and movable with the slide 13. A spring 51 interposed between the plunger and bushing serves to urge the bushing upward against the downward acting force of the valve spring 46.

To control and limit movement of the plunger 49 with respect to its socket and to its supporting slide 13 there is mounted on the wall of the control box 24 a bracket 52 journaling the rockshaft 53 having a first arm or shifter 54 provided with a rounded abutment portion 55 resting on the mushroom head 48 of said second plunger 49.

A second rock arm 56 is likewise secured to the rockshaft 53 and extends inward in parallel relation to the arm 54. This second arm is provided with the shifter pin 57 riding in slot 58 of the head or yoke 59 on the upper end of the threaded adjusting shaft 60. This shaft extends downward through the rotatable nut 61 journaled in the bearing 62 secured on the frame member 12. The nut has integral therewith or secured thereto bevel pinion 63 meshing with a second bevel pinion 64 journaled in the bracket 65 and operable by the hand wheel 66. By this construtcion rotation of the hand wheel 66 will turn nut 61 and impart desired vertical or up and down movement to the rod or shaft 60. For determination of the amount of this movement, the member 60 is provided with the pointer or indicator 67 movable with the member and cooperating with scale 68 secured to the vertical portion of the frame 12.

For actuation of the vertical movement control hydraulic motor 18, there has been provided a hydraulic pressure system including the pump 69 discharging hydraulic medium under pressure from reservoir 70 into the pressure conduit 71 at a pressure determined by the variable relief valve 72. As shown in Figure 2, the pressure conduit 71 is ported into the bore or interior of the bushing 44, while also ported into this bushing are the reservoir or low pressure return conduits 73 and 74 and the motor conduit lines 75 and 76. The spool 45 is provided with the grooved portions 77 and 78 separated by the spool portion or flange 79.

Downward movement of the spool 45, as influenced by spring 46, will serve to couple the pressure conduit 71 with motor conduit 76 operating the motor to cause the downward feeding of the cutter supporting slide 13, while coupling motor conduit 75 to return conduit 74. Upward movement of the spool past its center position will oppositely connect the conduits. The pressure conduit 71 will be connected to conduit 75 reversely to actuate motor 18 and cause upward movement of the slide 13 while conduit 76 is coupled to reservoir conduit 73.

In the machine shown in Patent No. 2,793,568, the spindle carrier 20 and the bearing 37 are connected for joint tilting movement, and the member 29 is driven reacting through the lug 80 on flange 32 to drive the arm 36. As the arm 36 is rotated about the tilted axis it will react against member 32 to cause an up and down movement of the plunger 33 and thus, through rocking of link 41, a corresponding movement of the valve 45 controlling the up or down movement of the slide 13 as an entirety. The arm 36 in cooperation with the flanged plunger 33 thereby serves as an automatic depth variator to effect automatic compensation of the positioning of the cutter for the purposes set forth in the Martellotti et al. patent. As the slide moves downward, the rock shaft 53 will also move down. Since arm 56 is pivotally connected by pin 57 to the stationary head 59, downward movement of the rock shaft 53 will cause upward movement of the portion 55 of arm 54. This will release plunger 49 so that the spring 51 can move the plunger upward. This motion will be transmitted to the right hand end of the link 41 acting as a feedback to restore the spool 45 to an intermediate or neutral position with respect to the bushing 44, stabilizing the position of the slide until such time as an additional downward movement is imparted to the plunger 33. Conversely, as the terminus of the arm 36 rotated from a lower toward an upper position, such as indicated in Figure 2, the plunger 33 will rise under the influence of spring 35 moving the valve spool 45 upward to cause upward movement of slide 13. In this event, the rock shaft 53 will move up also, thereby depressing the portion 55 of arm 54. This will depress the plunger 49, and the right hand end of the link 41 will move downward following the plunger 49 due to reaction of spring 46 on valve spool 45. This movement will again serve as a follow-up restoring the valve spool 45 to its intermediate or neutral position.

The control just exercised is a purely automatic follow-up proposition. However, when it is desired to effect a manual vertical adjustment of the slide 13 and cutter 22 this may be done by rotating handle 66 and nut 61 causing an upward or downward movement of the rod or shaft 60 and head or yoke 59. This will cause a corresponding rocking or oscillatory movement of the member 54, relieving or depressing the plunger 49 according to direction of adjustment. In this instance, the lever 41 will rock about its end 40 as a fulcrum to control the position of the spool 45 and thus the upward or downward movement of the slide. For example, if the head 49 is moved upward, causing or permitting an upward rocking of the link or lever 41 about the fulcrum 40, this will raise the spool 45 causing upward movement of slide 13. As the members 36, 33, 40 and 44 are all carried by the slide, such upward movement of the slide will upwardly shift the yoke 39 and ball of fulcrum point 40, shutting off the valve. In this manner, a considerable amount of vertical movement may be imparted to the member 13 in accordance with the amount of rocking imparted to the lever 54 but with slight actual physical displacement of the valve spool 45 due to the constant automatic feed back action. It will be evident that any adjustment effected by movement of the member 60 will vary the zone of positioning of the cutter 22 and slide 13 while the amount of adjustment of the slide within the selected zone will be under control of the plunger 33. It will further be understood that the position of the spool 45 with respect to the bushing 44 is the resultant of the separate adjusting movements applied to the end 40 and the end 47 respectively of the link or lever 41 and that in some instances, for combined setting and control purposes, the plunger 33 and the plunger 49 may be simultaneously adjusted but in opposite directions, thereby neutralizing any effect on the valve or alternatively both adjusted in the same direction when the reaction on the valve 45 will be additive.

In Figure 4 has been illustrated a slight modification of the invention in which the rod or link 41 in place of resting on the head 48 of the plunger 49 is directly mounted in the slot of the yoke 59 so that the fulcrum point is directly shifted by movements of the member 60.

What is claimed is:

1. A milling machine including a frame and a slide movably supported by the frame, means for effecting movement of the slide relative to the frame, said means including a source of pressure and a slide actuating motor, and means for controlling the reaction of the source of pressure on the slide actuating motor, including a conduit system, a reversing valve in said system carried by the slide, a stem on the valve, a link intermediately pivoted to the valve stem, an automatic depth variator carried by the slide and coupled with one end of the link for oscillating the link to shift the valve stem, a variably positionable fulcrum carried by the slide and engaging the other end of the link, and a spring reacting on the link to urge said other end of the link into engagement with the fulcrum.

2. A milling machine including a frame and a slide movably supported by the frame, means for effecting movement of the slide relative to the frame, said means including a source of pressure and a slide actuating motor, and means for controlling the reaction of the source of pressure on the slide actuating motor, including a conduit system, a reversing valve in said system carried by the slide, a stem on the valve, a link intermediately pivoted to the valve stem, an automatic depth variator carried by the slide and coupled with one end of the link for oscillating the link to shift the valve stem, a variably positionable fulcrum carried by the slide and engaging the other end of the link, a spring reacting on the link to urge said other end of the link into engagement with the fulcrum, a fulcrum adjusting member carried by the frame, and connections between the member and the fulcrum for adjusting the fulcrum.

3. A milling machine including a frame and a slide movably supported by the frame, means for effecting movement of the slide relative to the frame, said means including a source of pressure and a slide actuating motor, and means for controlling the reaction of the source of pressure on the slide actuating motor, including a conduit system, a reversing valve in said system carried by the slide, a stem on the valve, a link intermediately pivoted to the valve stem, an automatic depth variator carried by the slide and coupled with one end of the link for oscillating the link to shift the valve stem, a variably positionable fulcrum carried by the slide and engaging the other end of the link, a spring reacting on the link to urge said other end of the link into engagement with the fulcrum, a fulcrum adjusting member carried by the frame, and connections between the member and the fulcrum for adjusting the fulcrum, said connections including a lever having one end pivoted to the slide and the other end engaging the fulcrum.

4. A milling machine including a frame, a slide movable on the frame, means including a hydraulic motor for moving the slide relative to the frame, a hydraulic actuating and control circuit for said motor including conduits and a control valve coupled with said conduits, said control valve including a bushing carried by the slide and a spool movable in the bushing, a spring urging movement of the valve in one direction with respect to the bushing, and means for determining the amount and direction of movement of the valve with respect to the bushing including a link intermediately pivoted to the valve, a first plunger carried by the slide and engaging one end of the link, a spring reacting on the plunger for rocking the link in one direction about its pivot connection to the valve, a second plunger carried by the slide and engaging the opposite end of the link, a spring reacting against said second plunger for rocking the link in the opposite direction about said pivot connection, a shifter carried by the slide and reacting on the first plunger in opposition to its spring variably to position the first plunger to oscillate the lever to move the valve, a second shifter, and means reacting on the second shifter to shift the second plunger upon relative movement of the slide and frame.

5. A milling machine including a frame, a slide movable on the frame, means including a hydraulic motor for moving the slide relative to the frame, a hydraulic actuating and control circuit for said motor including conduits and a control valve coupled with said conduits, said conttrol valve including a bushing carried by the slide and a spool movable in the bushing, a spring urging movement of the valve in one direction with respect to the bushing, and means for determining the amount and direction of movement of the valve with respect to the bushing including a link intermediately pivoted to the valve, a first plunger carried by the slide and engaging one end of the link, a spring reacting on the plunger for rocking the link in one direction about its pivot connection to the valve, a second plunger carried by the slide and engaging the opposite end of the link, a spring reacting against said second plunger for rocking the link in the opposite direction about said pivot connection, a shifter carried by the slide and reacting on the first plunger in opposition to its spring variably to position the first plunger to oscillate the lever to move the valve, a second shifter, means reacting on the second shifter to shift the second plunger upon relative movement of the slide and frame, and means for adjusting the second shifter relative to the frame to adjust the position of said second plunger, and thereby the positions of said lever and said valve.

6. The structure set forth in claim 4 in which said second shifter includes a lever having one end engaging the second plunger and the other end fulcrumed to the slide, and means connecting the lever and the frame for oscillating the lever about its fulcrumed end upon movement of the slide.

7. The structure set forth in claim 6 in which said connecting means are adjustable to oscillate the lever relative to the slide.

References Cited in the file of this patent
UNITED STATES PATENTS

| | | |
|---|---|---|
| 1,991,597 | Davidson | Feb. 19, 1935 |
| 2,055,530 | Hallenbeck | Sept. 29, 1936 |
| 2,293,059 | Hirvonen | Aug. 18, 1942 |
| 2,569,526 | Johnson | Oct. 2, 1951 |
| 2,678,177 | Chenery | May 11, 1954 |